T. A. WILLARD.
STORAGE BATTERY SEPARATOR.
APPLICATION FILED MAY 5, 1917.

1,295,660.

Patented Feb. 25, 1919.

Inventor.
Theodore A Willard
By Thurston & Kwis
attys.

UNITED STATES PATENT OFFICE.

THEODORE A. WILLARD, OF CLEVELAND, OHIO.

STORAGE-BATTERY SEPARATOR.

1,295,660.

Specification of Letters Patent.  Patented Feb. 25, 1919.

Application filed May 5, 1917. Serial No. 166,553.

*To all whom it may concern:*

Be it known that I, THEODORE A. WILLARD, a citizen of the United States, residing at Cleveland, in the county of Cuyahoga and State of Ohio, have invented a certain new and useful Improvement in Storage-Battery Separators, of which the following is a full, clear, and exact description.

This invention relates to storage battery separators, and has particular reference to separators of the ribbed type. The object of the present invention is to provide a separator which is stronger and has longer life than separators generally employed prior to this invention. A further object is to provide a separator formed wholly or in part of rubber and provided with ribs which cannot be easily broken off the separator body and which add materially to the strength of the separator.

The invention may be briefly summarized as consisting in certain details of construction and in certain novel combinations of the separator body and rib forming material as will be described in the specification and set forth in the appended claims.

Figure 1:
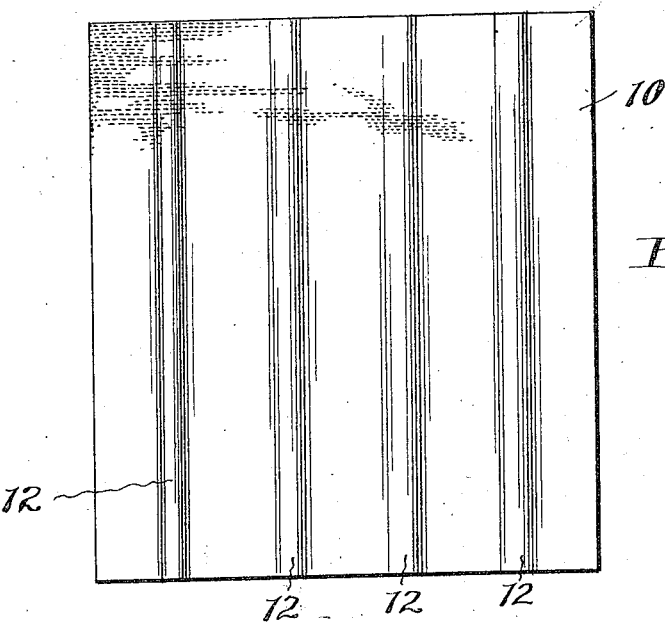
Figure 3:
Figure 2:
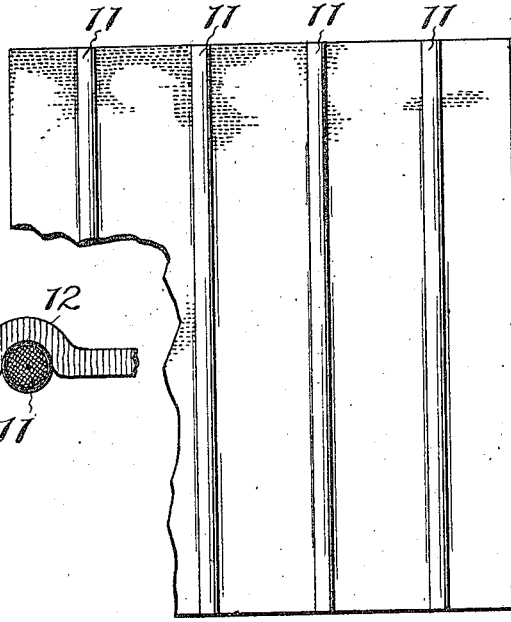
Figure 4:
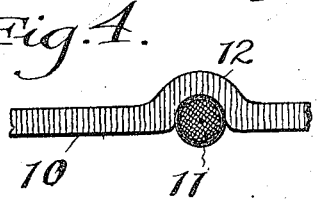

In the accompanying sheet of drawings, Figure 1 is a view looking toward one side or face of a separator constructed in accordance with my invention; Fig. 2 is a view looking toward the opposite side or face of the separator; Fig. 3 is an end or edge view of the separator; and Fig. 4 is an enlarged cross sectional view through a portion of a separator body and one of the ribs which is attached thereto.

The separator made in accordance with my invention includes a body portion 10 which is preferably formed wholly or partially of rubber. If formed wholly of rubber it will consist of a flat sheet of rubber perforated to provide the necessary porosity. Preferably, however, the body portion 10 of the separator is formed of rubber and fibrous porous material, the fibrous material being closely arranged and held or cemented together by the rubber, and extending through the separator body from one side thereof to the other to provide porosity. This type of separator and the method by which the same may be made is disclosed in certain of my prior patents including the following: No. 1,243,368 and No. 1,243,370, granted October 16, 1917.

The present invention resides particularly in the rib forming material which is used in conjunction with, or is applied to the body 10 of the separator, and also in the resulting structure obtained by what I believe to be new rib forming material, applied in a novel manner.

It will be observed that the separator shown in the drawings is ribbed on both sides. These ribs are formed by partially embedding in one side of the separator body strips or strands of rib forming material 11, so as to distend or press outwardly the separator body 10 opposite the rib forming material, thus forming ribs on the reverse side, as well as on the side to which the rib forming material 11 is applied.

This rib forming material 11 preferably consists of rubber coated or covered cords of fibrous material. The cords may be formed of hemp, as is customary, or of other material twisted together so as to form a cord or cable having considerable tensile strength.

The ribbed separator above described may be made in the following manner: The section forming the body of the separator will be previously cut to the proper size, particularly as to its thickness, it not being absolutely necessary that the section before the ribbing operation have the exact length and width dimensions of the finished separator. The section or body 10 is preferably in semi-vulcanized condition before the ribs are applied, and therefore rather soft and pliable.

The cords which are applied to the plate or body 10, are previously covered or coated with rubber which can be applied by running the cords through a tank or receptacle containing rubber cement or rubber dissolved in a suitable solvent. It is unnecessary that the rubber penetrate to any material extent beyond the surface of the cords, but it is important that the cords be thoroughly covered or coated with the rubber before being applied to the separator body.

Next the ribs are formed by compressing the body 10 and the rib forming material between the component parts or halves of a mold, the faces of the two parts of the mold being suitably grooved so that when the parts are brought together, the grooves of one half the mold will receive the cords and squeeze the separator body down into the grooves of the other half of the mold so that the separator body and cords assume the shape and relative positions shown in Fig. 3.

Then the separator with the ribs applied thereto is vulcanized, preferably while being compressed in the mold, and after the vulcanizing operation the separator is hard and retains the shape given it in the mold, while at the same time the rib forming cords are thoroughly knitted or vulcanized to the separator body.

The separator formed in accordance with my invention is very strong. At the same time it has long life, the cords very materially adding to the strength of the separator. In this respect the separator has a distinct advantage over separators to which strips of rubber are vulcanized to form the ribs, and it possesses also the further advantage that the ribs are not fragile and easily pulled or broken off the separator body.

I believe it is new with me to utilize cords or fibrous strands to form the ribs of a separator, whether or not said cords are embedded in the separator body, and I believe it is new also to press or embed rib forming material or strips into one side of the separator body and to form ribs on both sides of a separator by partially embedding in one side thereof, rib forming material of any character, and especially rib forming material consisting of fibrous cords.

Therefore, while I have shown simply one form of my invention and have mentioned the preferred materials, I do not wish to be confined solely to the rubber covered cords as the rib forming material, nor do I wish to be limited to a construction wherein the rubber covered cords as the rib forming material are embedded in the separator body, but aim in my claims to cover all modifications which do not involve a departure from the spirit and scope of my invention in its broadest aspects.

Having thus described my invention, what I claim, is:

1. A separator for storage batteries composed of a body portion having rib forming material consisting of fibrous cords or strands attached to the separator body.

2. A separator for storage batteries comprising a separator body having ribs formed by rubber covered fibrous cords vulcanized to the body.

3. A separator for storage batteries comprising a separator body formed at least in part of rubber and ribs formed by rubber coated fibrous cords vulcanized to the body.

4. A storage battery separator consisting of a body of rubber and fibrous material extending therethrough, and ribs formed from strands of fibrous rubber covered material vulcanized to the body.

5. A storage battery separator comprising a body and rib forming material attached thereto and embedded therein.

6. A storage battery separator composed of a separator body with rib forming material attached thereto and partly embedded therein, the rib forming material partly projecting from one side of the body and the latter being distended opposite said rib forming material so as to provide ribs on both sides of the body.

7. A storage battery separator composed of a body formed at least in part of rubber, and rubber covered rib forming material embedded in and vulcanized to the body.

8. A storage battery separator comprising a body formed at least in part of rubber with rubber covered rib forming strips vulcanized to the body and partially embedded therein so as to project partly from one side of the body and to distend the material of the body opposite said strands so as to provide ribs on both sides of the body.

9. A storage battery separator composed of a body formed at least in part of rubber, and rubber covered fibrous cords attached to the body and partly embedded therein so as to distend the body opposite the cords and thereby provide ribs on both sides of the separator.

10. A storage battery separator comprising a body composed of rubber and fibrous material extending through the body from one side thereof to the other, and rib forming material consisting of rubber covered fibrous cords pressed into the body and vulcanized thereto so as to provide ribs on both sides of the body.

11. A storage battery separator comprising a separator body or section having strips pressed or embedded in one side thereof so as to distend the body and form ribs on the opposite side of the latter.

In testimony whereof I hereunto affix my signature.

THEODORE A. WILLARD.